United States Patent [19]
Hill

[11] Patent Number: 5,358,162
[45] Date of Patent: Oct. 25, 1994

[54] EXTERIOR LUGGAGE SYSTEM FOR AUTOMOTIVE VEHICLES

[76] Inventor: Richard Hill, 11556 Woodbridge Blvd., Seminole, Fla. 34642

[21] Appl. No.: 5,389

[22] Filed: Jan. 15, 1993

[51] Int. Cl.$^5$ .................................................. B60R 9/04
[52] U.S. Cl. ..................... 224/316; 224/319; 224/324; 224/328
[58] Field of Search ............... 224/316, 319, 324, 325, 224/326, 328, 329

[56] References Cited

U.S. PATENT DOCUMENTS

| | | |
|---|---|---|
| 1,028,168 | 6/1912 | Williams . |
| 1,428,098 | 9/1922 | James . |
| 2,434,387 | 1/1948 | Brandt . |
| 2,469,945 | 5/1949 | Brei . |
| 2,532,154 | 11/1950 | Duskin . |
| 2,585,745 | 2/1952 | Crosby . |
| 2,596,860 | 5/1952 | McCrory et al. . |
| 2,755,896 | 7/1956 | Breglia . |
| 2,806,563 | 9/1957 | Einhorn . |
| 3,901,360 | 8/1975 | Cook . |
| 3,931,919 | 1/1976 | Gerber et al. ..................... 224/324 |
| 4,210,186 | 7/1980 | Belenson . |
| 4,245,764 | 1/1981 | Kowalski et al. . |
| 4,274,568 | 6/1981 | Bott ..................... 224/319 |
| 4,586,638 | 5/1986 | Prescott et al. . |
| 4,684,048 | 8/1987 | Bott ..................... 224/324 |
| 4,733,810 | 3/1988 | Graber et al. . |
| 4,778,092 | 10/1988 | Grace ..................... 224/331 |
| 4,951,818 | 8/1990 | Johnson . |
| 5,094,502 | 3/1992 | Mote ..................... 224/316 |

FOREIGN PATENT DOCUMENTS

846621 7/1970 Canada ..................... 224/328
WO86/00584 1/1986 World Int. Prop. O. .

Primary Examiner—Renee S. Luebke
Attorney, Agent, or Firm—Watson, Cole, Grindle & Watson

[57] ABSTRACT

A pair of rigid supports each have an upper slot and a lower slot. Strap brackets are adjustably mounted in the upper slots and support members are adjustably mounted in the lower slots. Straps extend around luggage and engage the brackets to retain the luggage in place. Stop members depend from the luggage and engage the supports. Spacer means is connected between the supports. Collapsible luggage includes a rigid bottom supporting U-shaped spring wire struts connected to one another by a connecting bar. A cloth shell is stretched over the bottom and the struts. Dividers are provided within the luggage. A rain cover includes overlapping waterproof portions. A one piece molded nose cone has a tapered forward surface to reduce wind resistance and includes a channel in its forward surface for receiving a strap. Flexible straps include a pair of strap portions each having one end connected to a rigid member and the opposite ends of the strap portions are connected to one another by a buckle. The rigid members fit within slots on the supports and are engageable with portions of the supports.

23 Claims, 6 Drawing Sheets

EXTERIOR LUGGAGE SYSTEM FOR AUTOMOTIVE VEHICLES

BACKGROUND OF THE INVENTION

The present invention relates to an exterior luggage system for automotive vehicles, and more particularly to a system and components thereof adapted to be mounted on the roof of the vehicle. The owners of automotive vehicles periodically need to carry more luggage than can be stored within the trunk or other storage space available within the vehicle. Accordingly, luggage systems have been developed to carry the excess luggage on the roof of the vehicle. These systems generally include a roof rack which is suitably mounted on the roof and secured in place, along with an arrangement for attaching the luggage to the roof rack.

Prior art systems have presented a number of problems. Many of them are difficult to mount in position and require an excessive amount of time to properly assemble. Furthermore, there is a tendency for the luggage to shift due to starting, stopping and turning movements of the vehicle as well as wind pressure when driving at high speed, whereby the luggage may not be properly maintained in position. Some of these systems also are quite heavy and do not provide a favorable ratio of roof rack weight to carrying capacity. Also, such systems are subject to corrosion when exposed to the elements. The components of prior art systems do not always provide good protection from rain, and are not sufficiently waterproof. The objective of the present invention is to provide a system wherein the disadvantages of the prior art are overcome.

SUMMARY OF THE INVENTION

The invention includes structure which permits a roof rack to be mounted on the vehicle in approximately one minute, while each container component can be mounted and anchored to the rack in approximately three minutes. Mounting of the system in operative position can be carried out in a simple and effective manner. The roof rack includes bars made of aluminum so as to be corrosion resistant and is lightweight so as to provide a good weight to carrying capacity. The containers cooperate with customized straps which can be mounted in place with minimum effort. These customized straps may be provided with rigid end portions which receive parts of the rack so that the end portions may be placed in slots in the roof rack components and then simply turned ninety degrees to lock them in place. The tightening buckle of the strap will automatically be positioned in the most convenient position to facilitate final tightening of the straps about the container components.

The containers may also be provided with suitable stop members thereon which are adapted to engage the support members of the roof rack to limit relative movement between the containers and the rack. The containers may also be provided with securing means for securing a nose cone to the forwardly facing end of a container to reduce drag and thereby enhance the gas mileage obtained by the vehicle as well as to reduce air flow noise.

The containers are also provided with rain covers which ensure a waterproof seal with the containers so that water cannot enter into the containers even in a driving rain. The rain covers each include an elastic edge portion adapted to snugly surround the associated container, and a belt is provided to secure each rain cover in place. The rain cover may also be provided with stop members thereon to engage the bars of the roof rack in an embodiment where the rain cover includes a portion disposed in underlying relationship to the bottom of the container. The last-mentioned rain cover is also provided with suitable handles for carrying the associated container component, and securing means is mounted on the outer portion thereof for securing a nose cone to one end thereof.

The roof rack of the invention includes a pair of extruded aluminum bars on which strap receiving brackets are adjustably mounted at infinite locations along the bars. These brackets receive both tie down straps directed laterally of the vehicle and extending around the containers as well an inertia strap directed longitudinally of the vehicle and extending around the containers. These straps resist lateral and longitudinal shifting of the components. The aforementioned stop members assist the inertia strap in resisting longitudinal movement of the components.

The aluminum bars of the roof rack are normally retained at a predetermined spacing from one another by spacer means which is detachably connected to at least one of the bars in such a manner that it can be quickly and easily detached and reattached thereto. This spacing is chosen to be the optimum spacing for the components normally carried by the bars. The spacer means may be disconnected from one of the bars so that the bars may be separated from one another by a different distance when so desired with the spacer means attached to one of the bars and suspended in mid air where it will cause no interference with the other elements of the invention.

The roof rack is supported on roof engaging support means of conventional construction, this support means being infinitely adjustable along the length of the associated bars so that the roof engaging means may be properly positioned on the vehicle regardless of the curvature of the roof thereof. The spacer means is flexible so that when it is operatively connected between the bars of the roof rack, it will allow the roof engaging support means to conform to the configuration of the roof of the vehicle.

The length of the bars can be varied according to the type vehicle with which the roof rack is to be used. Each roof rack normally consists of two spaced bars, and a plurality of roof racks may be used with certain vehicles such as full size cars and vans or the like. Obviously, the adjustability of the brackets on the bars and the ability of the bars to be moved different distances from one another permit the roof rack to be employed with many different types of loads such as lumber, pipes, skis, ladders, furniture etc. All parts of the rack except for rubber feet on the roof engaging support means and the gutter clips used to hold the racks in place an a vehicle are made of aluminum to provide maximum corrosion resistance. A rack weight of 12 pounds is adapted to easily carry a load of 250 pounds.

The invention also includes a collapsible soft sided piece of luggage having a rigid bottom portion and a plurality of separate spring wire struts of generally U-shaped configuration which are detachably supported by the bottom portion. The rigid bottom portion allows the piece of luggage to straddle and be supported on the bars of the roof rack. A rigid connecting bar interconnects the struts, and a cloth shell is stretched over the struts to define side walls and a top of the piece of luggage. The connecting bar causes the struts to act together in resisting wind pressure on the end of the component when driving at high speed, and ensures that the component will return to its original shape when the wind pressure is removed. The struts serve to hold the piece of luggage in erected open position while packing and also provide sufficient structural strength so that the hold down straps and the inertia strap can be tightened around the container. This component also includes divider means which is attachable to the struts to divide the interior of the piece of luggage into compartments. A pair of cloth handles are secured to the cloth shell to facilitate carrying of the component. Of course, when so desired, the struts may be removed from the rigid bottom portion and the component may be collapsed for shipping or storage in a flattened condition.

The invention further includes a piece of luggage having rigid bottom and wall portions along with a separate rigid removable top portion. The bottom portion includes spaced stop members depending from the rigid bottom portion for engaging with the rack bars and limiting relative movement therebetween. The bottom portion and wall portions are preferably formed of one piece molded plastic construction. A pair of belts are secured to the rigid bottom and are used to lock the cover in a sealed position. Divider means is also provided in this container for dividing the interior of the piece of luggage into a plurality of compartments. Cloth handles are secured to the undersurface of the rigid bottom wall thereof. Securing means is also provided on one end of the container for securing a nose cone thereto. Securing means may also be provided on a rain cover for the component to secure the nose cone in position. Caster wheels may also be provided on the bottom of this component, and a pull strap is connected to one end of the piece of luggage for pulling the luggage along a support surface.

The invention additionally includes a nose cone comprising a one piece molded body including a tapered forward surface. The body includes a rearward surface having securing means thereon and guiding means is provided in the form of a lip extending peripherally of the rearward surface and generally perpendicular thereto. A recessed channel is formed in the forward surface of the nose cone for receiving an inertia strap therein. The tapered forward surface of the nose cone not only reduces wind resistance, but also reduces the level of noise generated by the wind and serves to deflect rain, dirt and insects.

DESCRIPTION OF THE PREFERRED EMBODIMENTS

Figure 1:
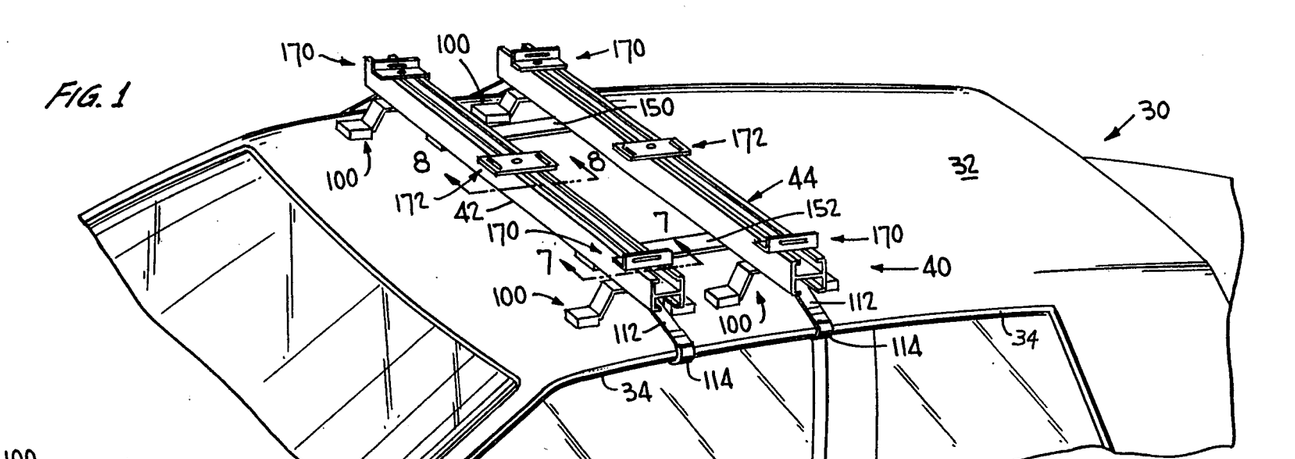
FIG. 1 is a top perspective view showing the roof rack mounted on the roof of an automobile.

Referring now to the drawings wherein like reference characters designate corresponding parts throughout the several views, there is shown in FIG. 1 an automobile 30 having a roof 32 with conventional rain gutters 34 disposed at opposite sides of the roof. A roof rack 40 includes a pair of identical elongated rigid bars or support members 42 and 44 formed of extruded aluminum.

Each of these bars has a cross-sectional configuration as shown in FIGS. 7, 8, 9, and 9A including a pair of spaced side walls 50 and 52 having facing surfaces formed thereon. A web portion 54 is connected between the facing surfaces and divides the side walls into upper and lower portions having upper and lower edges respectively. A pair of upper walls 56 and 58 extend toward one another from the upper edges of the side walls and terminate short of one another to define spaced inner edges 60 and 62. A pair of depending wall portions 64 and 66 extend from the inner edges of the upper walls toward web portion 54 and have lower curved surfaces 68 and 70 thereon. Wall portions 64 and 66 also define inner surfaces 72 and 74 thereon.

A pair of lower walls 76 and 78 extend toward one another from the lower edges of the side walls and terminate short of one another to define spaced inner edges 80 and 82. A pair of upstanding wall portions 84 and 86 extend upwardly from the inner edges of the lower walls and have upper curved surfaces 88 and 90 thereon. Wall portions 84 and 86 also define inner surfaces 92 and 94 thereon.

The inner edges 60 and 62 of the upper walls and the inner surfaces 72 and 74 of the depending wall portions define an upper slot therebetween, and the inner edges 80 and 82 of the lower walls and the inner surfaces 92 and 94 of the upstanding wall portions define a lower slot therebetween.

Figures 2, 3:
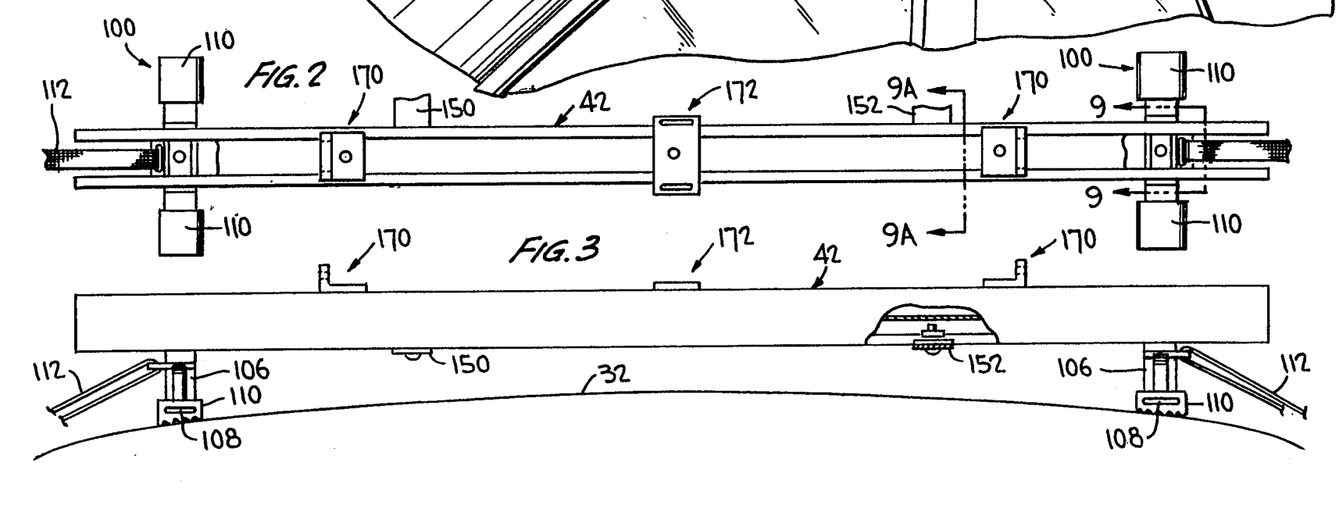
FIG. 2 is a top view, partly broken away, of one of the bars of the roof rack.
FIG. 3 is a front view, partly broken away, of the bar shown in FIG. 2.
Figure 6:
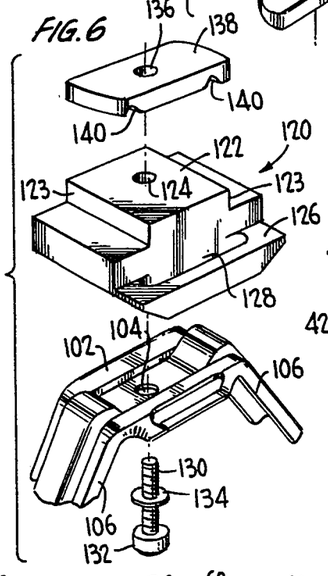
FIG. 6 is an enlarged exploded perspective view of a portion of one of the roof engaging support means shown in FIG. 1.

As seen in FIGS. 1-3, each of the roof rack bars is provided with a pair of roof engaging support means 100 including conventional foot brackets which as seen in FIGS. 2, 3 and 6 include a top portion 102 having a hole 104 formed therethrough. A pair of legs 106 extend downwardly from top portion 102 at an angle thereto and terminate in feet 108. These feet are surrounded by rubber portions 110 having grooves formed in the bottom and having varying thickness to conform to the shape of the roof in a known manner. Conventional adjustable straps 112 having the usual gutter clips 114 thereon are provided to secure the foot brackets to the gutter at either side of the vehicle. These clips are rubber coated to prevent damage to the painted gutters.

Figure 9:
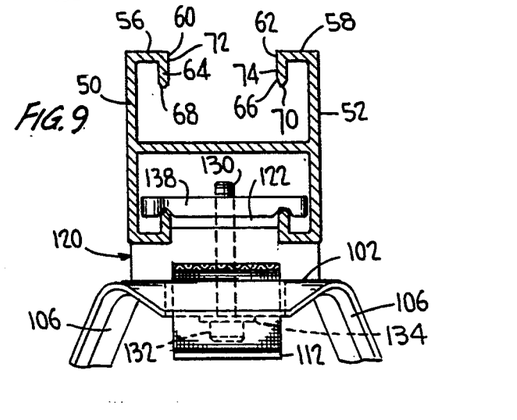
FIG. 9 is an enlarged cross-sectional view taken along line 9—9 of FIG. 2.

The foot brackets are infinitely adjustably connected to an associated bar by the detachable connecting means shown in FIGS. 6 and 9. A solid block of aluminum 120 includes a central upstanding portion 122 thereon having opposite parallel side wall portions 123 which are adapted to fit within the lower slot formed in bar 42. A hole 124 is formed completely through the block, and a laterally offset portion 126 has a slot 128 formed therethrough for receiving a strap 110. A bolt 130 has an enlarged head 132 with a countersunk socket therein for receiving an end wrench. A washer 134 is disposed about the bolt adjacent the head, the bolt passing upwardly through hole 124 and being threaded into a correspondingly threaded hole 136 formed through a locking member 138. This locking member has grooves 140 formed on the undersurface thereof for receiving the rounded ends formed on the upstanding wall portions at the bottom of the bar. It is apparent that the roof engaging support means may be infinitely adjusted along the length of the associated bar and locked in position by locking member 138. When it is desired to move the roof engaging support means, bolt 130 can be loosened, and then retightened in a new location. If it is desired to remove the roof engaging support means, bolt 130 can be loosened and member 138 turned to a position parallel with the lower slot through which it can freely pass since its width is less than that of the slot.

Figure 10:
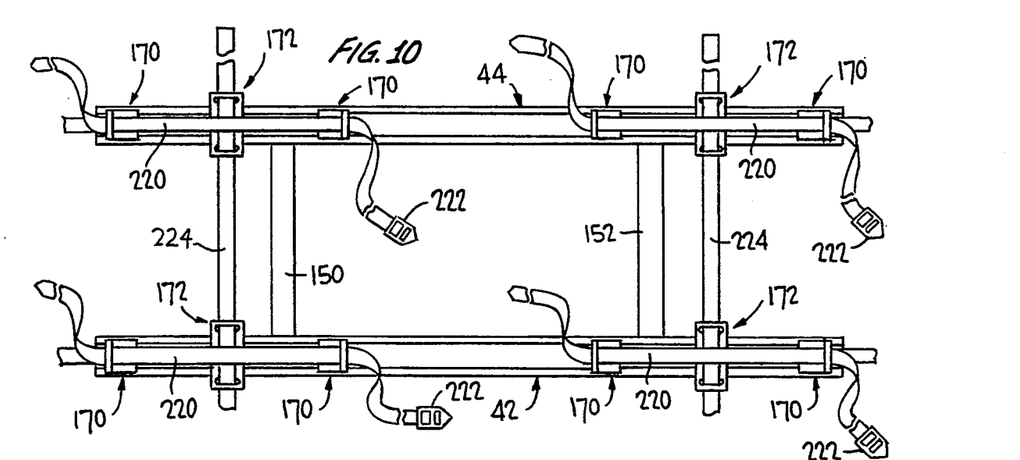
FIG. 10 is a top view of the roof rack.

As seen in FIGS. 1, 2 and 10, spacer means is provided for maintaining bars 42 and 44 in optimum spaced relationship for use with the containers of the invention. The spacer means comprises a pair of strips of aluminum 150 and 152 disposed beneath the bars and having the opposite ends of the strips detachably connected to the bars. These strips are sufficiently strong to maintain the bars in the desired spaced relationship, but are flexible enough to allow the rubber portions 110 on the feet of the roof engaging support means to conform to the contour of the roof of the vehicle.

Figure 9A:
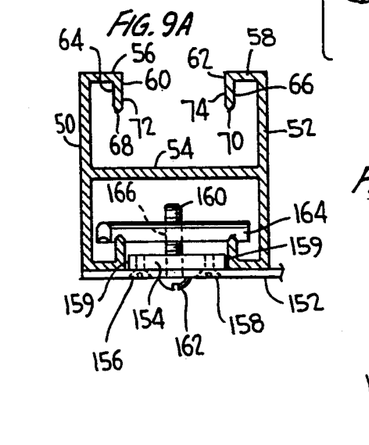
FIG. 9A is an enlarged cross-sectional view taken along line 9A—9A of FIG. 2.

Referring to FIG. 9A, the detachable connection between the spacer strips and a bar is illustrated. A block of aluminum 154 is secured to the upper surface of strip 152 by a pair of screws 156 and 158 disposed within suitable holes provided in members 152 and 154. The opposite side edges 159 of block 154 are parallel with one another and fit within the lower slot in the bar. A bolt 160 extends through suitable holes provided through members 152 and 154. The bolt includes a round head 162 which has a countersunk socket therein to receive an end wrench. A locking member 164 has a threaded hole 166 formed therethrough which receives the threaded end of bolt 160. The undersurface of locking member 164 is provided with grooves formed therein for receiving the upper rounded ends of the upstanding wall portions at the bottom of the bar. It is evident that the position of the spacer means can be readily adjusted along the length of the bars, and furthermore, one end of the spacer strips can be readily removed from a bar by loosening bolt 160 and turning locking member 164 parallel with the slot through which it can pass since the width thereof is less than that of the slot.

Figure 4:
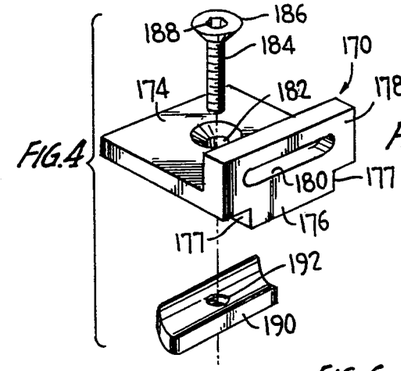
FIG. 4 is an enlarged exploded perspective view of a hold down bracket shown in FIG. 1.
Figure 7:
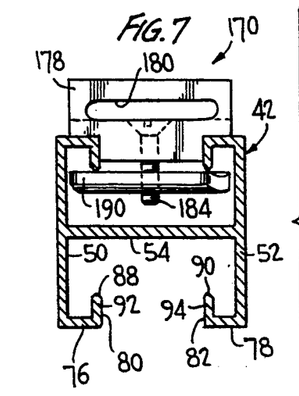
FIG. 7 is an enlarged cross-sectional view taken along line 7—7 of FIG. 1.
Figure 8:
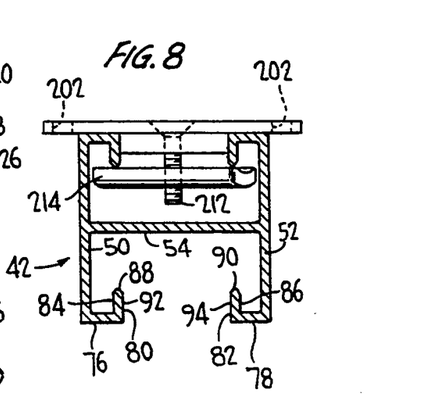
FIG. 8 is an enlarged cross-sectional view taken along line 8—8 of FIG. 1.

As seen in FIGS. 1-3, each of bars 42 and 44 are provided with a pair of hold down brackets 170 and an intermediate inertia bracket 172. Each of these brackets is formed of aluminum and is adjustably mounted in the upper slot in the bars. As seen in FIG. 10, each bar may be provided with a plurality of hold down brackets and a plurality of inertia brackets. Referring to FIGS. 4 and 7, each hold down bracket includes a flat body portion 174 having a depending portion 176 with parallel side edges 177 which fit within the upper slot of an associated bar. An upstanding wall 178 is formed along one edge of the flat body portion and has a strap receiving slot 180 formed therethrough. Body portion 174 has a hole 182 formed therethrough which receives a bolt 184 having an enlarged flat head 186 with a countersunk socket 188 therein for receiving an end wrench. A locking member 190 has a threaded hole 192 therethrough which receives the bolt. This arrangement permits the hold down brackets to be infinitely adjusted along an associated bar by loosening the bolt and moving a bracket to a desired position and then tightening the bolt. If it is desired to remove the bracket, the bolt is loosened and locking member 190 turned to a position parallel with the slot through which it can pass since the width thereof is less than that of the slot.

Figure 5:
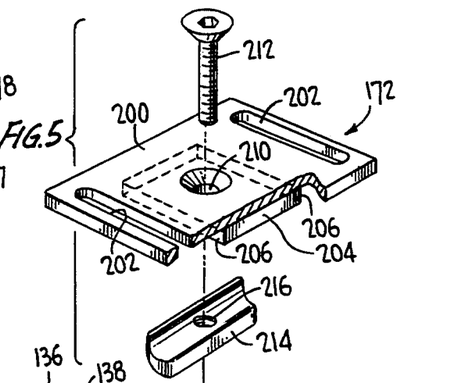
FIG. 5 is an enlarged exploded perspective view of an inertia bracket shown in FIG. 1.

Referring now to FIG. 5, each inertia bracket 172 is formed of aluminum and includes a flat body portion 200 having strap receiving slots 202 formed at opposite ends thereof. The body portion includes a depending portion 204 having opposite parallel sides 206 which are adapted to fit within the upper slot in an associated bar. A hole 210 is formed through the body portion and receives a bolt 212 similar to bolt 184. A locking member 214 has a threaded hole 216 formed therethrough which receives bolt 212. The inertia bracket may be infinitely adjusted along a bar and locked in position thereon or removed therefrom in the same manner as discussed in connection with the hold down brackets.

Figure 11:
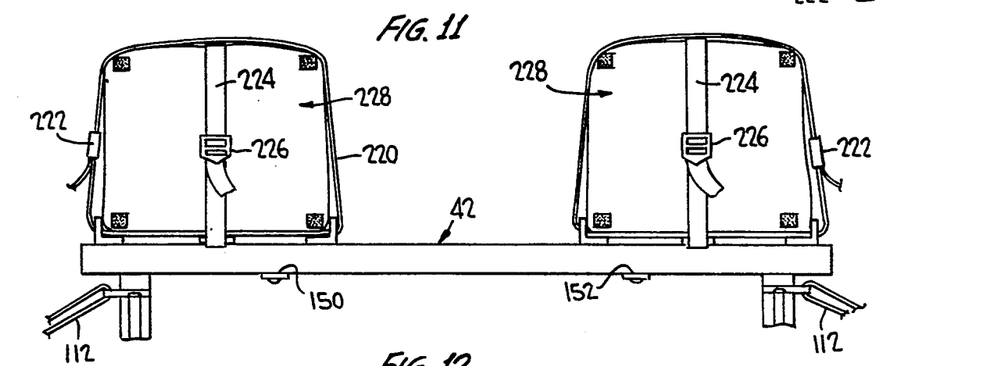
FIG. 11 is a front view of the roof rack illustrating a pair of container components supported thereon.

Referring now to FIG. 10, a hold down strap 220 is threaded through slots 180 of each adjacent pair of hold down brackets 170 on one of the bars. These straps may be formed of nylon and each strap has a conventional fast action non-slip buckle 222 connected to one end thereof. An inertia strap 224 formed of nylon is threaded through aligned inertia brackets 172 mounted on different bars, each inertia strap also having a fast actin non-slip buckle 226 connected to one end thereof as seen in FIG. 11 which illustrates a pair of containers 228 mounted on the roof rack. A third container could be mounted between the containers shown, if desired. It is apparent that the hold down straps extend laterally of the vehicle and parallel with the bars and extend around containers 228 and are tightened by means of buckles 222 to hold the container in place. A pair of straps 220 extend around each container and serve to prevent lateral shifting of the load when in use. The inertia straps 224 extend longitudinally of the vehicle and in a direction perpendicular to the bars. A single inertia strap extends around each container and is tightened by means of a buckle 226. The inertia straps resist movement of the load longitudinally of the vehicle in response to acceleration and deceleration thereof.

Figures 23, 25, 26, 27:
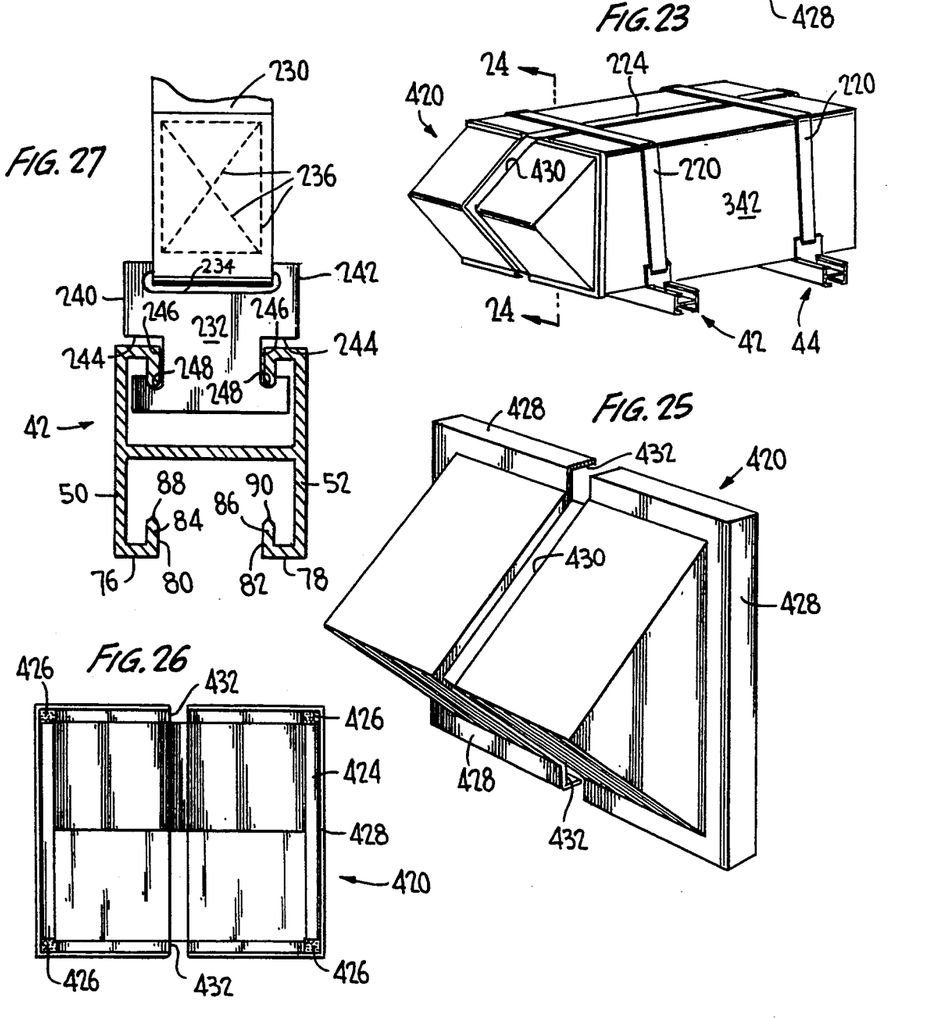
FIG. 23 is a top perspective view of a piece of luggage having a nose cone secured thereto.
FIG. 25 is an enlarged top perspective view of the nose cone shown in FIG. 23.
FIG. 26 is a rear view of the nose cone shown in FIG. 23.
FIG. 27 is a cross-sectional view illustrating a hold down strap having a rigid end portion connected with a bar of the roof rack.
Figure 24:
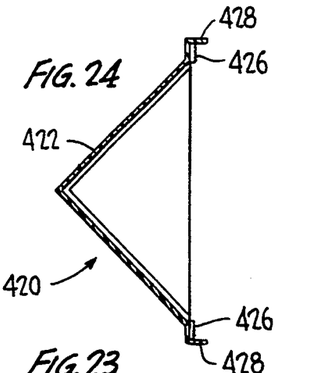
FIG. 24 is an enlarged cross-sectional view taken along line 24—24 of FIG. 23.

It should be noted that the length of the straps is chosen so that the buckles thereon are readily accessible at the sides and ends of pieces of luggage on the roof rack. Referring to FIG. 27, a modification of the invention is illustrated wherein the hold down brackets may be eliminated. In this arrangement, hold down straps 230 are connected at the ends thereof to rigid members 232 formed of aluminum and having a slot 234 formed therein which receives the end of the strap which is doubled on itself and stitched together by stitching 236. The rigid member is provided with opposite edge portions 240 and 242 having openings formed therein for receiving the depending wall portions of the associated bar. These openings are defined by inwardly extending edges 244 joining edges 246 extending at right angles thereto. Edges 246 join rounded recesses 248 which receive the lower rounded edges of the depending wall portions of the bar. It is noted that these openings in the edge portions of the rigid member are generally complementary to the configuration of the upper part of the bar.

This arrangement permits the rigid member 232 to be inserted into the upper groove in a bar and then turned at right angles thereto so that the elements are in the operative position shown in FIG. 27. This construction enables the hold down straps to be quickly and easily interconnected or disconnected with the bars. Each hold down strap includes a pair of strap portions 230 having one end thereof connected to a rigid member 232. The opposite ends of the pair of strap portions 230 are connected to the two parts of a buckle similar to those previously described. The length of the two portions 230 is sized such that the buckles will be positioned on the sides of a piece of luggage on the roof rack so as to be in the ideal position at the side of a piece of luggage where it can readily be tightened. An important feature of this modification is that when the pair of strap portions 230 of a hold down strap are tightened about a piece of luggage using the buckle parts connected to the strap portions, the rigid members connected to the strap portions are pulled upwardly into the position shown in FIG. 27 wherein the profile of the upper portion of the bar is received in the complementary openings in the edge portions of the rigid members. The rigid members are therefore locked to the bar so that the cannot move into a position where the rigid members could escape from the bar regardless of any vibrations occurring during movement of the associated vehicle.

Figures 13, 14, 15:
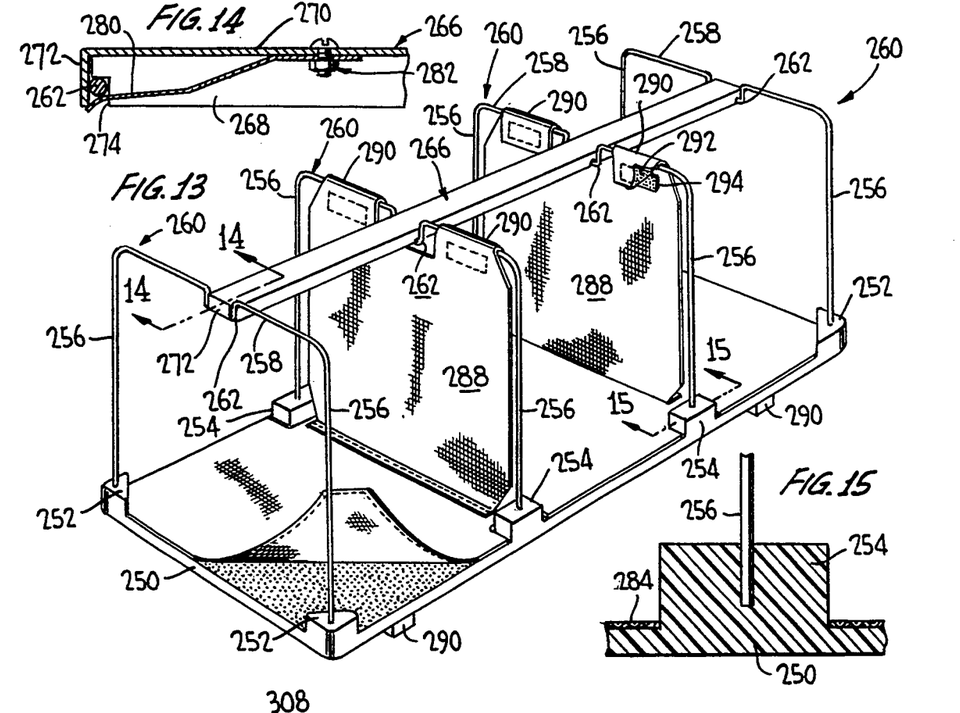
FIG. 13 is a top perspective view of a partly assembled collapsible soft sided piece of luggage.
FIG. 14 is an enlarged cross-sectional view taken along line 14—14 of FIG. 13.
FIG. 15 is an enlarged cross-sectional view taken along line 15—15 of FIG. 13.

Referring to FIGS. 13-17, a soft sided piece of luggage is illustrated. An integral rigid molded plastic base 250 is provided with upstanding support portions 252 at the four corners thereof, and a pair of additional upstanding support portions 254 are provided, along each side of the base. Each of the support portions is provided with a hole in the upper surface which has a slip fit with a leg 256 of strut 260, as seen in FIG. 15. Four similar struts 260 are provided, these struts being formed of spring wire and being generally U-shaped to include a pair of spaced legs 256 joined by a bight portion 258. Each bight portion includes a centrally located offset portion 262 which is itself of generally upwardly facing U-shaped configuration for receiving a rigid connecting bar 266.

Connecting bar 266 is formed of aluminum and has a generally downwardly facing U-shaped cross-section including a pair of spaced parallel side walls 268 joined by a top wall 270. This top wall is bent downwardly at opposite ends to define end walls 272. The ends of the side walls are cut out at 274 to receive the lower part of the offset portions 262 of the end struts. The side walls 268 have cutouts 276 formed in the lower edges thereof to receive the lower part of the offset portions 262 of the intermediate struts.

The connecting bar is interconnected with the struts in the position shown in FIG. 13 to rigidify the assembly. As seen in FIG. 14, the connecting bar is locked to the end struts by a spring clip 280 which is connected to the top wall 270 by a nut and bolt assembly 282, the bolt extending through suitable holes provided in the top wall and the spring clip. It is apparent that the connecting bar can be released from the struts by pulling down on the spring clips and then lifting the connecting bar from the struts.

A nylon liner 284 is secured as by a suitable adhesive 286 to the upper surface of the base 250. A pair of nylon divider members 288 have the lower edges thereof secured as by stitching to the liner 284. The upper edge of each of these divider members is provided with a pair of spaced flaps 290 each of which has a area 292 of a conventional hook and loop type connector means such as VELCRO secured thereto which cooperates with an area 294 of a conventional hook and loop type connector means such as VELCRO on the divider 288 so that the flaps can be folded over the bight portion of an intermediate strut and secured in place with the two areas 292 and 294 engaging one another. The central portions of each of the divider members is cutout to provide clearance with the connecting bar. It should be understood that the divider members can be disconnected from the struts and left on the bottom of the piece of luggage if it is not desired to divide the interior into two or more compartments.

The rigid base 250 also includes a pair of integral depending stop members 290. These stop members extend across the width of the base, but each stop member may also be replaced by a pair of spaced stop members if so desired. In any event, the stop members are spaced from one another in a direction longitudinally of the piece of luggage so that the two edges of the stop members facing toward the adjacent ends of the piece of luggage are spaced from one another a distance slightly less than the spacing between the facing surfaces of the two bars of the roof rack. In other words, the stop members will fit between the bars and serve to limit movement of the piece of luggage relative to the bars in a direction longitudinally of the vehicle, thereby serving the same general purpose of the straps to hold the load in place when the vehicle is accelerating or decelerating. The stop members also assist in properly placing a piece of luggage in supported position on the bars. These stop members reduce the tension required in the straps to provide the necessary pressure on the containers to hold them in position.

Figures 16, 17:
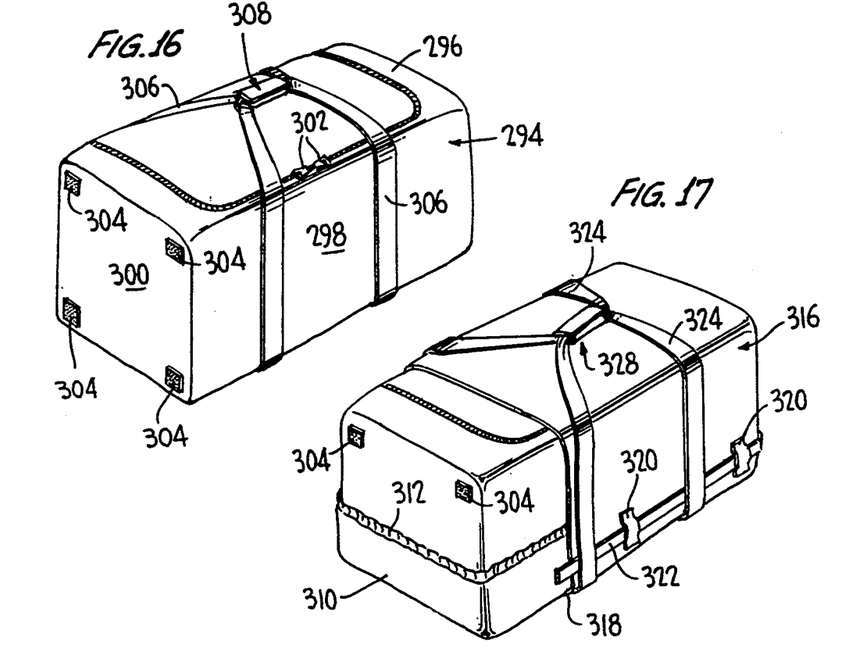
FIG. 16 is a top perspective view of the fully assembled collapsible piece of luggage.
FIG. 17 is a view of the piece of luggage shown in FIG. 16 with a rain cover thereon being partly broken away.

Referring to FIG. 16, the piece of luggage includes a cloth shell 294 formed of nylon which is stretched over the base and struts to define a top surface 296, a pair of opposite side surfaces 298 and a pair of end surfaces 300. A bottom surface underlies the undersurface of the rigid base and may be provided with a pair of slots therein for receiving the stop members 290. Optionally, the stop members may be eliminated on the base and provided on the bottom surface of the shell if so desired. The top surface of the shell is provided with a pair of zippers 302 to provide a three sided opening at the top of the piece of luggage. One end surface 300 of the shell is provided with four spaced areas 304 of Velcro which are either adhesively attached or stitched thereto for securing a nose cone thereto as described hereinafter. A pair of cloth handles 306 are secured to the bottom surface of the shell as by stitching and can be connected to one another as shown at 308 by a conventional hook and loop type connector means such as VELCRO overlay, i.e., one handle has an area of a conventional hook and loop type connector means such as VELCRO thereon, and a flap is secured to the handle. This flap has another area of a conventional hook and loop type connector means such as VELCRO thereon, and the flap can be folded around the other handle with the two areas of a conventional hook and loop type connector means such as VELCRO engaging one another.

A rain cover is shown in FIG. 17 and includes a waterproof inner portion 310 formed for example of a rubberized fabric which is impervious to water. This inner portion is adapted to fit over the base 250 and extends upwards over about one-third of the height of the cloth shell. The inner portion includes an upper elastic edge 312 which snugly engages the outer surface of the cloth shell. The elastic edge is made by sewing elastic cord into the edge. The inner portion may be left in operative position even on days when no rain is encountered and the remainder of the rain cover is not used.

The rain cover also includes an outer portion 316 formed of waterproof fabric as portion 310 and is adapted to fit over the top of the piece of luggage and extend downwardly over the inner portion of the rain cover and includes an elastic lower edge 318 adapted to fit around the rigid base. Belt loops 320 are attached to the outer surface of portion 316 of the rain cover and receive an adjustable belt 322 having a buckle similar to those previously described to enable the belt to be tightened, thereby providing a good weather seal between the inner and outer portions of the rain cover.

Figure 12:
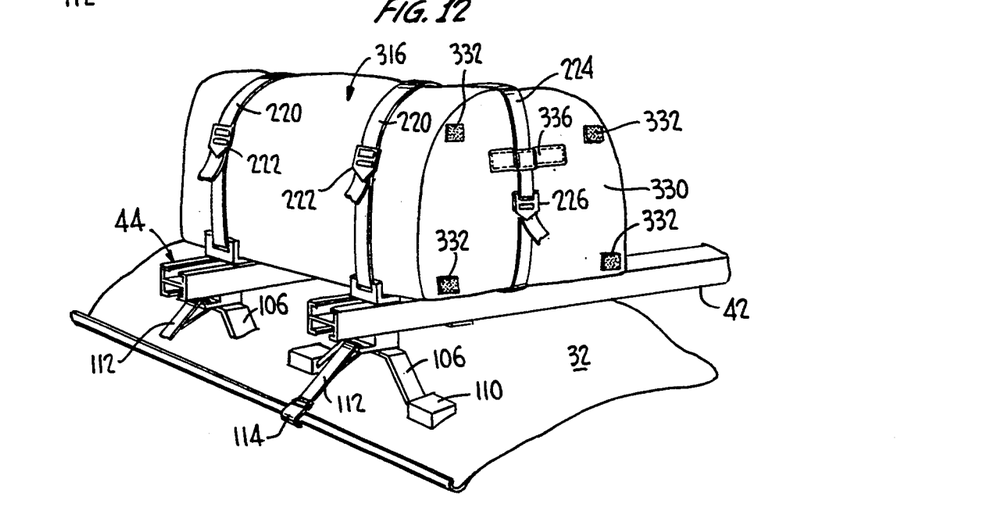
FIG. 12 is a top perspective view of a portion of the roof rack shown in FIG. 11.

A pair of cloth handles 324 are connected as by stitching to the undersurface of inner portion 310 of the rain cover and can be connected to one another as shown at 328 by a conventional hook and loop type connector means such as VELCRO overlay. The handles permit the piece of luggage to be carried with the rain cover either in place as shown in FIG. 17 or with the rain cover removed as shown in FIG. 16. As seen in FIG. 12, the piece of luggage is shown with the rain cover thereon whereby the outer portion 316 includes an end surface 330. This end surface is provided with four spaced areas of a conventional hook and loop type connector means such as VELCRO 332 suitably secured thereto for attaching a nose cone as hereinafter described. Also, as seen in FIG. 12, opposite ends of the rain cover may be provided with handles 336 to facilitate placing the piece of luggage in position on the roof rack.

Hold down straps either as shown in FIG. 10 or FIG. 27 can be used with this piece of luggage, the struts and connecting bar providing sufficient structural rigidity to permit the hold down straps and inertia straps to be tightened about the piece of luggage. Furthermore, this piece of luggage may be readily collapsed and stored or shipped in flattened condition. This can be done by removing the cloth shell, removing the connecting bar from the struts, and then removing the struts from the rigid base. The divider members are also disconnected from the struts if used. The device then occupies little space and can be readily stored or shipped. When it is desired to subsequently use the device, it can be readily assembled by reversing the steps used in disassembling the device.

Referring now to FIGS. 18-21, another piece of luggage is illustrated. A one piece molded body of plastic material includes a rigid bottom 340 and rigid side walls 342 and rigid end walls 344. A separate rigid removable top portion 346 includes a depending lip 348 fitting within the end and side walls to accurately locate the top portion in position. The top portion is formed of the same material as the remainder of the piece of luggage. The rigid bottom includes integral depending stop members 350 which operate in the same manner as the stop members previously described to prevent excessive movement of the piece of luggage longitudinally of a vehicle. Four areas 352 of a conventional hook and loop type connector means such as VELCRO are mounted as by a suitable adhesive to one end wall 344 of the device to secure a nose cone thereto as hereinafter described.

Figures 18, 19, 20:
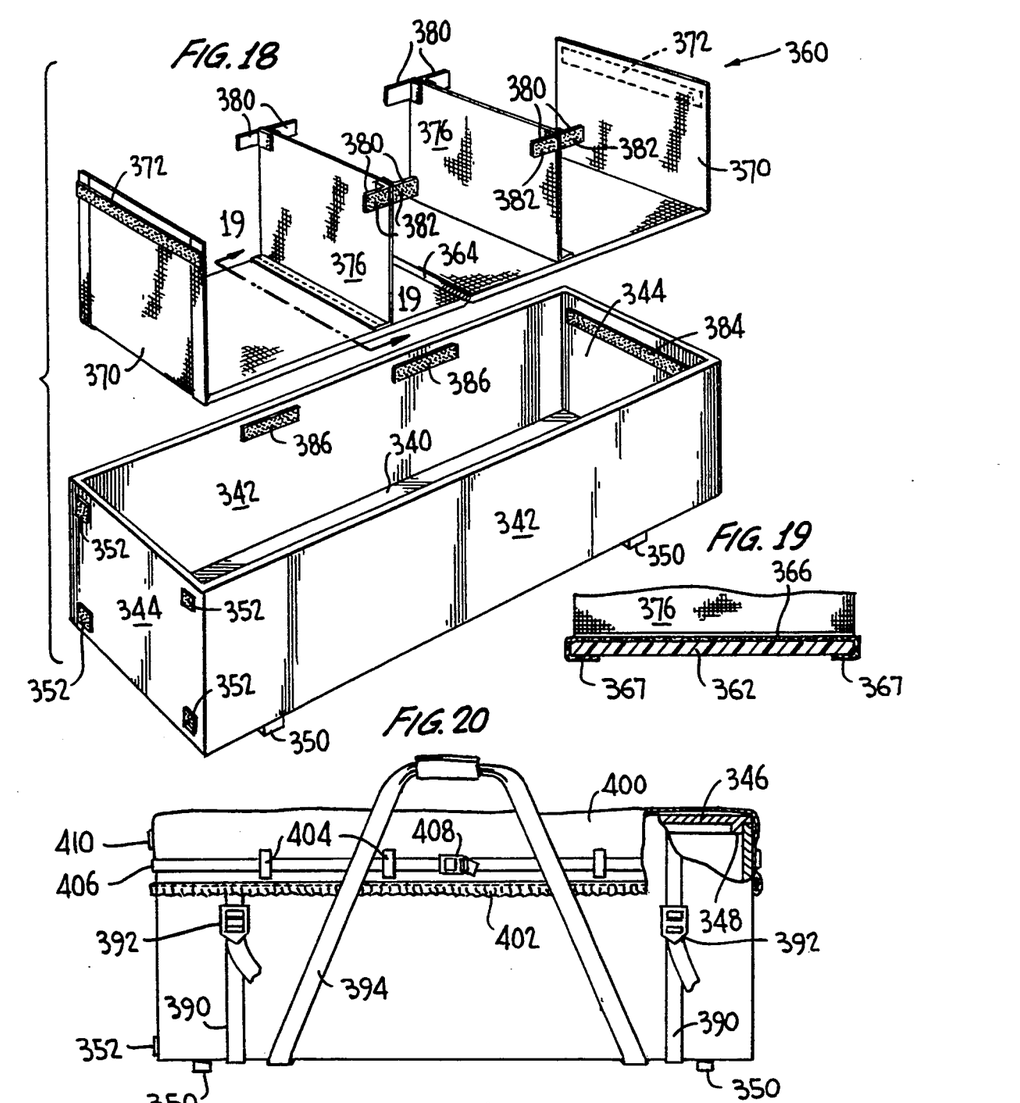
FIG. 18 is a top perspective exploded view of a piece of luggage having rigid bottom and wall portions.
FIG. 19 is an enlarged cross-sectional view taken along line 19—19 of FIG. 18.
FIG. 20 is a side view partly broken away of the piece of luggage shown in FIG. 18 with a lid and rain cover thereon.

An insert 360 is provided for insertion into the interior of the aforedescribed body. Insert 360 is shown in its erected position, it being understood that it can be collapsed so as to be readily stored. The insert includes a pair of similar plastic bottom members 362 which are spaced from one another to define a dividing line 364 so that the insert can be folded up. A bottom piece of nylon 366 is disposed over the upper surfaces of bottom members 362 and has the opposite edges 367 thereof disposed around the opposite edges of the bottom members and adhesively secured to the undersurface of the bottom members.

The piece of nylon 366 continues beyond the outer opposite ends of the bottom members to define opposite end surfaces 370 having areas 372 of Velcro suitably secured thereto so as to face the inner surfaces of the end walls 344 of the container. A pair of nylon divider members 376 are secured as by sewing to bottom piece of nylon 366 and are adapted to extend upwardly as shown in FIG. 18. The upper side edges of divider members 376 have pairs of flaps 380 stitched thereto, these flaps having areas 382 of a conventional hook and loop type connector means such as VELCRO thereon.

The interior of the container includes a pair of areas 384 of a conventional hook and loop type connector means such as VELCRO suitably secured to the inner surfaces of the end walls 344 thereof which are adapted to cooperate with areas 372 of Velcro on the insert to hold the opposite end surfaces of the insert in position adjacent the end walls of the container. Opposite side walls 342 of the container are provided with spaced areas 386 of a conventional hook and loop type connector means such as VELCRO on the inner surfaces thereof adapted to cooperate with areas 382 of Velcro to hold the opposite edges of divider members 376 in operative position to divide the interior of the container into compartments if so desired. It is apparent that if it is not desired to so divide the interior of the container, divider members 376 can rest on the bottom piece of nylon 366. Furthermore, insert 360 can be completely removed from the container if desired.

Figure 22:
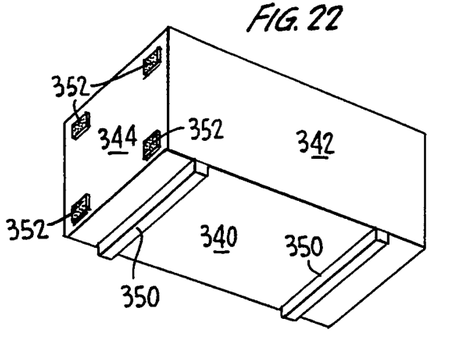
FIG. 22 is a bottom perspective view of the piece of luggage shown in FIGS. 18-20.

A pair of similar nylon belts 390 have portions thereof adhesively secured to the undersurface of the rigid bottom of the container and extend around the container. These belts are provided with buckles 392 similar to those previously described and are used to lock the top portion of the container in sealed position. A pair of cloth handles 394 similar to those previously described have portions thereof adhesively secured to the undersurface of the rigid bottom of the container to facilitate carrying of the container.

A rain cover 400 formed of material similar to that of the previously described rain cover fits over the top portion of the container and downwardly over a part of the wall portions thereof. This cover has a lower elastic edge 402 similar to that on the previously described rain cover and which is adapted to snugly engage the outer surfaces of the wall portions of the container. Belt loops 404 are provided adjacent the lower elastic edge, and a belt 406 is threaded therethrough. The belt includes a buckle 408 similar to those previously described which enables the belt to be tightened to provide a good weather seal of the rain cover with the container. When the rain cover is in position, the two uppermost areas 352 of a conventional hook and loop type connector means such as VELCRO on the end of the container are covered up. In this case one end of the rain cover is provided with areas 410 of a conventional hook and loop type connector means such as VELCRO so that a nose cone can be connected to one end of the piece of luggage.

Figure 21:
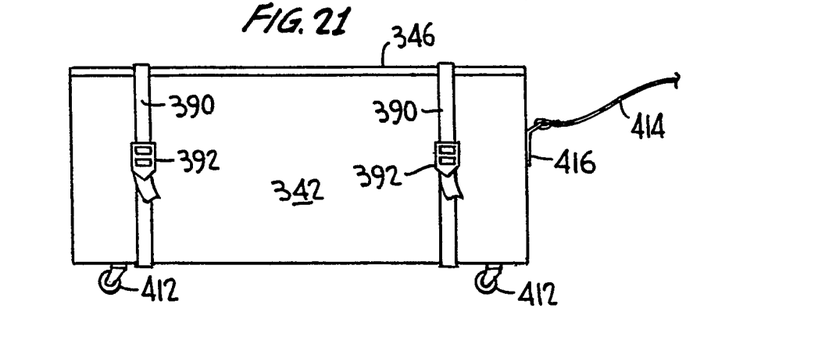
FIG. 21 shows the piece of luggage shown in FIGS. 18-20 as modified to include caster wheels and a pull strap.

Referring to FIG. 21, a modification is illustrated wherein the container is provided at the four lower corners with conventional caster wheels 412. A pull strap 414 is connected to a fitting 416 secured to one end wall of the container for pulling the container along a support surface.

Referring now to FIGS. 23-26, a nose cone for use with a piece of luggage is illustrated. The nose cone 420 is formed as a one piece molded plastic body including a tapered forward surface 422. The body includes a rearward surface 424 extending therearound as seen in FIG. 26, four areas 426 of a conventional hook and loop type connector means such as VELCRO being adhesively secured thereto for cooperation with the areas of a conventional hook and loop type connector means such as VELCRO on the containers previously described to secure the nose cone in operative position. The nose cone includes a guiding means in the form of a lip 428 extending peripherally of the rearward surface and generally perpendicular thereto. This lip is adapted to fit around the end of either of the containers previously described to guide the nose cone into proper operative position. A recessed channel 430 is aligned with slots 432 in the upper and lower edges of the nose cone for receiving an inertia strap 224 as shown in FIG. 23 which illustrates a container in supported position on the roof rack with the straps in place and with a nose cone secured to the forward end of the container.

The invention has been described with reference to preferred embodiments. Obviously, various modifications, alterations and other embodiments will occur to others upon reading and understanding this specification. It is my intention to include all such modifications, alterations and alternate embodiments insofar as they come within the scope of the appended claims or the equivalent thereof.

What is claimed is:

1. An exterior luggage system for automotive vehicles comprising a roof rack including a pair of spaced rigid elongated support members, each of said support members having an upper slot and a lower slot formed therein, a plurality of strap receiving brackets adjustably mounted in said upper slot, roof engaging support means adjustably mounted in said lower slot, a piece of luggage extending between said spaced support members and being supported thereby, a plurality of straps engaging said strap receiving brackets, said straps extending around and engaging said piece of luggage to retain the piece of luggage in position on said support members, and spaced stop members depending from said piece of luggage for engaging said support members and limiting relative movement between said piece of luggage and said support members.

2. A system as defined in claim 1 wherein each of said support members includes a pair of tie down strap receiving brackets, an inertia strap receiving bracket between said pair of tie down strap receiving brackets, a tie down strap extending through said tie down strap receiving brackets on each support member, and an inertia strap extending through said inertia receiving brackets on both of said support members.

3. A system as defined in claim 1 including spacer means connected between said pair of elongated support members for maintaining said support members in predetermined spaced relationship.

4. A system as defined in claim 3 including connecting means for detachably connecting said spacer means to said support members, said connecting means being mounted within the lower slot of each of said support members.

5. A system as defined in claim 1 wherein said piece of luggage is collapsible and includes a rigid bottom portion, a plurality of separate spring wire struts of generally U-shaped configuration each of which includes a pair of spaced legs joined by a bight portion, said legs having ends detachable supported by said rigid bottom portion, a rigid connecting bar interconnecting the bight portions of each of said struts to one another, and a cloth shell stretched over said struts to define side walls and a top of said piece of luggage.

6. A system as defined in claim 5 including securing means at one end of said piece of luggage, a nose cone comprising a one piece molded body including a tapered forward surface to reduce wind resistance, said body including a rearward surface, securing means on said rearward surface for securing the nose cone to the securing means at one end of said piece of luggage, and guiding mean for guiding said nose cone into position on the end of the piece of luggage.

7. A system as defined in claim 5 including a rain cover for said piece of luggage, said rain cover including a waterproof inner portion fitting over the rigid bottom of said piece of luggage and a waterproof outer portion fitting over the top of said piece of luggage and overlapping said inner portion, and means for retaining said rain cover in operative position.

8. A system as defined in claim 1 wherein said piece of luggage comprises a body including a rigid bottom portion, rigid side wall portions and a separate rigid removable top portion, said spaced stop members being formed integral with said rigid bottom portion.

9. A system as defined in claim 8 including securing means at one end of said piece of luggage, a nose cone comprising a one piece molded body including a tapered forward surface to reduce wind resistance, said body including a rearward surface, securing means on said rearward surface for securing the nose cone to the securing means at one end of said piece of luggage, and guiding mean for guiding said nose cone into position on the end of the piece of luggage.

10. A system as defined in claim 8 including a rain cover for said piece of luggage, said rain cover comprising a waterproof cloth cover fitting over the top of said piece of luggage and extending downwardly over a part of said side wall portions, and means for retaining said cover in operative position.

11. An exterior luggage system for automotive vehicles comprising a roof rack including a pair of spaced rigid elongated support members, each support member including a pair of spaced side walls having facing surfaces thereon, a web portion connected between said facing surfaces and dividing said side walls into upper and lower portions having upper and lower edges respectively, a pair of upper walls extending toward one another from the upper edges of said side walls and terminating short of one another to define paced inner edges, a pair of lower walls extending toward another from the lower edges of said side walls and terminating short of one another to define spaced inner edges, a pair of depending wall portions extending from the inner edges of said upper walls toward said web portion, a pair of upstanding wall portions extending from the inner edges of said lower walls and having inner surfaces thereon, the inner edges of said upper walls and the inner surfaces of said depending wall portions defining an upper slot therebetween, the inner edges of said lower walls and the inner surfaces of said upstanding wall portions defining a lower slot therebetween, roof engaging support means being adjustably mounted in said lower slot, a piece of luggage extending between said support members and being supported thereon, and flexible strap means extending around and engaging said piece of luggage in position on said support members, said strap means including a pair of strap portions, each strap portion having one end thereof connected to a rigid member, the opposite ends of the strap portions being connected together by a buckle, said rigid members having opposite edge portions each of which has an opening formed therein for receiving said depending wall portions on one of said support members so that when a pair of strap portions are tightened about the piece of luggage, the depending wall portions on the support members are received within the openings in said rigid members to lock the rigid members to the support members.

12. A roof rack for use in a luggage system for automotive vehicles comprising, a pair of spaced rigid elongated support members for supporting pieces of luggage extending therebetween, each support member including a pair of spaced side walls having facing surfaces thereon, a web portion connected between said facing surfaces and dividing said side walls into upper and lower portions having upper and lower edges respectively, a pair of upper walls extending toward another from the upper edges of said side walls and terminating short of one another to define spaced inner edges, a pair of lower walls extending toward another from the lower edges of said side walls and terminating short of one another to define spaced inner edges, a pair of depending wall portions extending from the inner edges of said upper walls toward said web portion, a pair of upstanding wall portions extending from the inner edges of said lower walls and having inner surfaces thereon, the inner edges of said upper walls and the inner surfaces of said depending wall portions defining an upper slot therebetween, the inner edges of said lower walls and the inner surfaces of said upstanding wall portions defining a lower slot therebetween, and roof engaging support means adjustably mounted in said lower slot, a pair of hold down strap receiving brackets for receiving a pair of hold down straps, said hold down strap receiving brackets being infinitely adjustable along the entire length of said support members, and an inertia strap receiving bracket disposed between said hold down brackets for receiving an inertia strap.

13. A collapsible soft sided piece of luggage for use in an exterior luggage system for automotive vehicles comprising a rigid bottom portion, a plurality of separate spring wire struts of generally U-shaped configuration each of which includes a pair of spaced legs joined by a bight portion, said legs having ends detachably supported by said rigid bottom portion, a rigid connecting bar interconnecting the bight portions of each of said struts to one another, a cloth shell stretched over said struts to define side walls and a top of the piece of luggage, the bight portion of each of said struts including an offset portion receiving and engageable with said connecting bar, and means for detachably connecting opposite ends of said connecting bar with the offset portions of a pair of said struts.

14. A collapsible soft sided piece of luggage for use in an exterior luggage system for automotive vehicles comprising a rigid bottom portion, a plurality of separate spring wire struts of generally U-shaped configuration each of which includes a pair of spaced legs joined by a bight portion, said legs having ends detachably supported by said rigid bottom portion, a rigid connecting bar interconnecting the bight portions of each of said struts to one another, a cloth shell stretched over said struts to define side walls and a top of the piece of luggage, and divider means secured to said rigid bottom portion and being attachable to the bight portion of at least one of said struts to divide the interior of said piece of luggage into a plurality of compartments.

15. A collapsible soft sided piece of luggage for use in an exterior luggage system for automotive vehicles comprising a rigid bottom portion, a plurality of separate spring wire struts of generally U-shaped configuration each of which includes a pair of spaced legs joined by a bight portion, said legs having ends detachably supported by said rigid bottom portion, a rigid connecting bar interconnecting the bight portions of each of said struts to one another, a cloth shell stretched over said struts to define side walls and a top of the piece of luggage, and spaced stop members secured to and depending from said rigid bottom portion for engaging support members of an associated roof rack.

16. A collapsible soft sided piece of luggage for use in an exterior luggage system for automotive vehicles comprising a rigid bottom portion, a plurality of separate spring wire struts of generally U-shaped configuration each of which includes a pair of spaced legs joined by a bight portion, said legs having ends detachably supported by said rigid bottom portion, a rigid connecting bar interconnecting the bight portions of each of said struts to one another, a cloth shell stretched over said struts to define side walls and a top of the piece of luggage, and a rain cover having a waterproof inner portion adapted to fit over said rigid bottom portion and extend upwardly over a part of said cloth shell, said inner portion of the rain cover having an upper elastic edge snugly engaging the outer surface of said cloth shell.

17. A piece of luggage as defined in claim 16 wherein said rain cover includes a waterproof outer portion adapted to fit over the top of the piece of luggage and extend downwardly over said inner portion of the cover, said outer portion of the cover having a lower elastic edge adapted to fit around said rigid bottom portion, belt loops being attached to the outer surface of said outer portion adjacent said lower edge, and an adjustable belt being threaded through said belt loops to provide a good weather seal between said inner and outer portions of the rain cover.

18. A piece of luggage as defined in claim 17 including a pair of cloth handles secured to the inner portion of said rain cover to facilitate carrying of the piece of luggage when the rain cover is mounted on the piece of luggage.

19. A piece of luggage as defined in claim 17 including spaced stop members secured to and depending from said inner portion of said rain cover for engaging support members of an associated roof rack.

20. A piece of luggage as defined in claim 17 including securing means on said outer portion of the rain cover for securing nose cone means to said outer portion at one end of the piece of luggage.

21. A piece of luggage for use in an exterior luggage system for automotive vehicles comprising a body including a rigid bottom portion and rigid wall portions, a separate rigid removable top portion, said bottom portion including spaced stop members depending from said bottom portion for engaging support members of an associated roof rack, and a rain cover including a waterproof cloth cover adapted to fit over the top of said piece of luggage and extending downwardly over a part of said wall portions, said cloth cover having a lower elastic edge snugly engaging the outer surface of said wall portions, belt loops being attached to the outer surface of said cloth cover adjacent said lower edge, and an adjustable belt being threaded through said belt loops to provide a good weather seal between said cloth cover and said side wall portions.

22. A piece of luggage as defined in claim 21 including securing means on said rain cover for securing a nose cone to said cover at one end of said piece of luggage.

23. A nose cone for attachment to a piece of luggage in an exterior luggage system for automotive vehicles, said piece of luggage having an end, said nose cone comprising a one piece molded body including a tapered forward surface to reduce wind resistance, said body including a rearward surface, securing means on said rearward surface for securing the nose cone to said piece of luggage, and guiding means for guiding said nose cone into position on the end of said piece of luggage, said nose cone including a recessed channel formed in said forward surface for receiving a strap.

* * * * *